US010757914B1

(12) United States Patent
Lin et al.

(10) Patent No.: US 10,757,914 B1
(45) Date of Patent: Sep. 1, 2020

(54) FEEDING ANALYSIS SYSTEM

(71) Applicant: National Taiwan University, Taipei (TW)

(72) Inventors: Ta-Te Lin, Taipei (TW); Cheng-Yu Kuan, Hsinchu County (TW); Yu-Chi Tsai, Taichung (TW); Jih-Tay Hsu, Taipei (TW); Shih-Torng Ding, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 16/522,675

(22) Filed: Jul. 26, 2019

(30) Foreign Application Priority Data

Apr. 17, 2019 (TW) .............................. 108113396 A

(51) Int. Cl.
| G01C 21/34 | (2006.01) |
| A01K 11/00 | (2006.01) |
| G06N 3/02 | (2006.01) |
| G06T 7/73 | (2017.01) |
| G06K 9/00 | (2006.01) |
| A01K 1/02 | (2006.01) |

(52) U.S. Cl.
CPC .......... *A01K 11/006* (2013.01); *A01K 1/0209* (2013.01); *G06K 9/00362* (2013.01); *G06K 9/00771* (2013.01); *G06N 3/02* (2013.01); *G06T 7/73* (2017.01)

(58) Field of Classification Search
None
See application file for complete search history.

(56) References Cited

U.S. PATENT DOCUMENTS

| 8,028,657 | B2 * | 10/2011 | Pratt .................... A01K 1/0023 |
| | | | 119/51.02 |
| 9,084,411 | B1 * | 7/2015 | McGlone ............... A01K 29/00 |
| 2005/0223997 | A1 * | 10/2005 | Umegard ............. A01K 11/006 |
| | | | 119/14.03 |
| 2008/0215473 | A1 * | 9/2008 | Cashman ............... A01K 11/00 |
| | | | 705/37 |

(Continued)

FOREIGN PATENT DOCUMENTS

| CN | 107292298 A | * 10/2017 |
| CN | 107292298 B | 4/2018 |

(Continued)

*Primary Examiner* — Chico A Foxx

(57) ABSTRACT

A feeding analysis system of milk-production livestock includes a plurality of image analysis devices and a central server signally connected to each image analysis device. Each image analysis device is configured to capture a plurality of images of a feeding field, perform a clear processing on the images, identify a plurality of facial images of the plurality of milk-production livestock for feeding action from the cleared images and generate a plurality of capturing signals by capturing the plurality of facial images and a feeding duration corresponding to the facial images, and transmit the capturing signals to the central server. The central server is configured to receive the capturing signals, identify the milk-production livestock identities of the facial images of the corresponding capturing signal and generate a feeding record by integrating the identified milk-production livestock identity and the feeding duration of the capturing signal.

5 Claims, 5 Drawing Sheets

(56) References Cited

U.S. PATENT DOCUMENTS

| | | | |
|---|---|---|---|
| 2008/0282985 A1* | 11/2008 | Schulte | A01K 1/12 119/14.02 |
| 2011/0298619 A1* | 12/2011 | O'Hare | A01K 11/008 340/573.1 |
| 2013/0319336 A1* | 12/2013 | Thompson | A01J 5/0133 119/14.02 |
| 2014/0157297 A1* | 6/2014 | Chao | G06Q 30/0201 725/14 |
| 2014/0180130 A1* | 6/2014 | Granz | A61B 5/4238 600/476 |
| 2015/0170460 A1* | 6/2015 | Marais | G07F 17/3267 463/20 |
| 2016/0050888 A1* | 2/2016 | Berckmans | A01K 5/02 119/51.02 |
| 2016/0066546 A1* | 3/2016 | Borchersen | A01K 5/02 382/110 |
| 2017/0347632 A1* | 12/2017 | Auer | A61D 17/002 |
| 2018/0211718 A1* | 7/2018 | Heath | G16H 20/10 |
| 2018/0228129 A1* | 8/2018 | Yajima | G06K 9/00979 |
| 2018/0249683 A1* | 9/2018 | Borchersen | A01K 5/02 |
| 2019/0012578 A1* | 1/2019 | Bhagavatula | G06K 9/6262 |
| 2019/0050926 A1* | 2/2019 | Cooper | G06Q 10/083 |
| 2019/0116764 A1* | 4/2019 | Komatsu | A01K 29/00 |
| 2019/0147305 A1* | 5/2019 | Lu | G06N 3/0454 382/157 |
| 2019/0266015 A1* | 8/2019 | Chandra | G06F 9/4881 |
| 2019/0354850 A1* | 11/2019 | Watson | G06N 20/00 |
| 2020/0143157 A1* | 5/2020 | Borchersen | G06K 9/00369 |

FOREIGN PATENT DOCUMENTS

| | | | | |
|---|---|---|---|---|
| CN | 109002769 | A | * | 12/2018 |
| CN | 208188853 | U | * | 12/2018 |
| TW | 200947316 | A | | 11/2009 |
| TW | 201539357 | A | | 10/2015 |
| WO | WO-2019138329 | A1 | * | 7/2019 ......... G06K 9/00221 |

* cited by examiner

S104

```
augmenting the at least one original facial image of
each piece of the milk-production livestock data          ～S1041
into a plurality of feature enhanced images
```

```
training the plurality of feature enhanced images in
a neural network-like training manner to generate a
face identification model. This step can be
performed, for example, by the second artificial          ～S1042
neural network training module 117 in FIG. 1B, but
not limited thereto
```

```
identifying the plurality of facial images
corresponding to each of the plurality of capturing
signals in accordance with the face identification
model. This step can be performed, for example, by        ～S1043
the face identification module 113 in FIG. 1B, but
not limited thereto
```

```
adding the facial images into the original facial
images in the milk-production livestock database to
update the plurality of original facial images after      ～S1044
the milk-production livestock identities of each of
the plurality of capturing signals are identified
```

FEEDING ANALYSIS SYSTEM

FIELD OF THE INVENTION

The present invention relates to a feeding analysis system and a feeding analysis method of milk-production livestock, and more particularly to a feeding analysis system and a feeding analysis method of milk-production livestock by using image identification.

BACKGROUND OF THE INVENTION

Humans raise milk-producing livestock, such as cows, to get a lot of milk quickly. The milk production of a cow is highly correlated with its eating status, so a farm operator has to ensure that each cow intakes enough grass or feed.

However, due to the limited manpower of a farm, in the past a cow may significantly become thin before the insufficient eating situation of the cow is noticed. While the milk production of the cow have been influenced.

In recent years, the radio frequency identification has been applied to cow management. An electronic tag can be in a form of a chip implanted into a cow body or in a form of a tag suspended on a neck of a cow. The electronic tag has the identity data of a cow, and some sensing devices and transmission devices are disposed in each feeding field having grass or feed, and when a cow come to eat, the cow identity of the cow can be transmitted to a management computer, and the feeding status of the cows can be under supervision.

However, an electronic tag is a chip implanted in a cow or a tag hung on a cow, and there is a risk of chip failure or tag-dropping. Moreover, the electronic tag may have a false sensing situation, for example, the electronic tag may be sensed when a cow just walk by a feeding filed instead of feeding. In addition, an electronic tag is an unnatural foreign matter for a cow. If a cow wears an electronic tag for a long term, the psychology of the cow may be influenced, thereby violating humanitarian spirit, or even causing actual health hazards that have not be scientifically proven.

SUMMARY OF THE INVENTION

The present invention provides a feeding analysis system of milk-production livestock, which has high instrument reliability and data accuracy and comply with humanitarian spirit.

The present invention further provides a feeding analysis method for milk-production livestock, which has high instrument reliability and data accuracy and comply with humanitarian spirit.

The feeding analysis system of milk-production livestock provided by the present invention is adapted to analyze a feeding status of a plurality of milk-production livestock in a milk-production livestock house, and the feeding analysis system includes a plurality of image analysis devices disposed around a plurality of feeding fields in the milk-production livestock house and a central server signally connected to each of the plurality of image analysis devices. Each of the plurality of image analysis devices includes an image capture module, an image pre-processing module, a feeding identification module and a data transmission module. The image capture module is configured to capture a plurality of images of one of the plurality of feeding fields. The image pre-processing module is electrically connected to the image capture module and configured to perform a clear processing on the plurality of image of one of the plurality of feeding fields. The feeding identification module is electrically connected to the image pre-processing module and configured to identify a plurality of facial images of the plurality of milk-production livestock for feeding action from the plurality images of one of the plurality of feeding fields have been processed by the clear processing and generate a plurality of capturing signals by capturing the plurality of facial images corresponding to each of the feeding actions and a feeding duration corresponding to the plurality of facial images. The data transmission module is electrically connected to the feeding identification module and configured to transmit the plurality of capturing signals. The central server includes a data receiving module, a milk-production livestock database, a face identification module and a feeding record generation module. The data receiving module is signally connected to the data transmission module and configured to receive the plurality of capturing signals. The milk-production livestock database has a plurality piece of milk-production livestock data, and each of the plurality pieces of milk-production livestock data includes a milk-production livestock identity and at least one original facial image associated with the milk-production livestock identity. The face identification module is electrically connected to the data receiving module and the milk-production livestock database, configured to identify the milk-production livestock identities of the plurality of facial images in each of the plurality of the capturing signals in accordance with the at least one original facial image of each of the plurality pieces of milk-production livestock data. The feeding record generation module is electrically connected to the face identification module and configured to generate feeding records by integrating the identified milk-production livestock identities and the feeding duration of each of the plurality of capturing signals.

In an embodiment of the present invention, the central server further includes a display device electrically connected to the feeding record generation module and configured to display the feeding record of each of the plurality of milk-production livestock.

In an embodiment of the present invention, the central server further includes a data augmentation module and an artificial neural network training module. The data augmentation module is electrically connected to the milk-production livestock database. The artificial neural network training module is electrically connected to the data augmentation module and the face identification module. The data augmentation module is configured to augment each of the plurality original facial image into a plurality of feature enhanced images, and the artificial neural network training module is configured to train the plurality of feature enhanced images to generate a face identification model, and the face identification module is configured to identify the plurality of facial images corresponding to each of the plurality of capturing signals in accordance with the face identification model.

In an embodiment of the present invention, the data augmentation module is configured to obtain the plurality of feature enhanced images by rotating, local twisting, and/or contrasting on each of the plurality of original face images.

In an embodiment of the present invention, the face identification module is further configured to add the plurality of facial images corresponding to each of the plurality capturing signals to the plurality of original facial images of the milk-production livestock database to update the plurality of original facial images, the data augmentation module and the artificial neural network training module update the face identification model in accordance with the updated plurality of original face images, wherein the milk-production livestock database establishes a new milk-production livestock identity for each of the plurality of facial images corresponding to each of the plurality of capturing signals when the face identification module fails to identify the milk-production livestock identities of the plurality of facial images corresponding to each of the plurality of capturing signals.

In an embodiment of the present invention, the image analysis device further includes an artificial neural network training module electrically connected to the feeding identification module, and the artificial neural network training module is configured to provide a feeding identification model to the feeding identification module to identify the plurality of facial images.

The feeding analysis method for milk-production livestock provided by the present invention is adapt to analyze a feeding status of a plurality of milk-production livestock feeding at least one feeding field in a milk-production livestock house, and the method includes steps of:

a. capturing a plurality of images of the at least one feeding field.

b. pre-processing the plurality of images to perform a clear processing on the plurality of images of the at least one feeding field.

c. identifying a plurality of facial images of the plurality of milk-production livestock for feeding action from the plurality images of the at least one feeding field have been processed by the clear processing and generating a plurality of capturing signals by capturing the plurality of facial images corresponding to each of the feeding actions and a feeding duration corresponding to the plurality of facial images.

d. providing a milk-production livestock database having a plurality pieces of milk-production livestock data, wherein each of the plurality pieces of milk-production livestock data includes a milk-production livestock identity and at least one original facial image associated with the milk-production livestock identity, and identifying the milk-production livestock identities of the plurality of facial images in each of the plurality of the capturing signals in accordance with the at least one original facial image of each of the plurality pieces of milk-production livestock data.

e. generating a plurality of feeding records by integrating the identified milk-production livestock identities and the plurality of feeding duration of each of the plurality of capturing signals.

In an embodiment of the present invention, the step of identifying the milk-production livestock identities of the facial images includes steps of: augmenting the at least one original facial image of each piece of the milk-production livestock data into a plurality of feature enhanced images; training the plurality of feature enhanced images in a neural network-like training manner to generate a face identification model; and identifying the plurality of facial images corresponding to each of the plurality of capturing signals in accordance with the face identification model.

In an embodiment of the present invention, after identifying the milk-production livestock identities of each of the plurality of capturing signals, the method further includes steps of: adding the facial images in each of the plurality of capturing signals into the plurality of original facial images of the milk-production livestock database to update the plurality of original facial images; and updating the face identification model in accordance with the updated plurality of original facial images.

In an embodiment of the present invention, when failing to identify the milk-production livestock identity of the plurality of facial images of a capturing signal in accordance with the plurality of original facial images of each piece of the milk-production livestock data, establishing a new milk-production livestock identity in accordance with the capturing signal.

The embodiments of the present invention obtain feeding information of the milk-production livestock by using image identification technology, and the adopted image analysis devices do not contact the milk-production livestock, so that the influences such as chip failure or tag-dropping due to the movements of the milk-production livestock can be avoided, thereby the embodiments of the present invention have high reliability. Further, because the feeding information of the milk-production livestock is obtained by using image identification technology in the embodiments of the present invention, a feeding information is recorded on when a feeding action is actually made by a milk-production livestock, the false sensing of an electronic tag in the prior art can be avoided, thereby the embodiments of the present invention have high accuracy. In addition, it is unnecessary for the embodiments of the present invention to implant chip into a milk-production livestock or hang a tag on the milk-production livestock, thereby complying with humanitarian spirit, and the unknown health hazards to the milk-production livestock can be avoided.

Other objectives, features and advantages of the invention will be further understood from the further technological features disclosed by the embodiments of the invention.

BRIEF DESCRIPTION OF THE DRAWINGS

The present invention will become more readily apparent to those ordinarily skilled in the art after reviewing the following detailed description and accompanying drawings, in which:

FIG. 2B is a flow chart of a method for identifying milk-production livestock identities of an embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
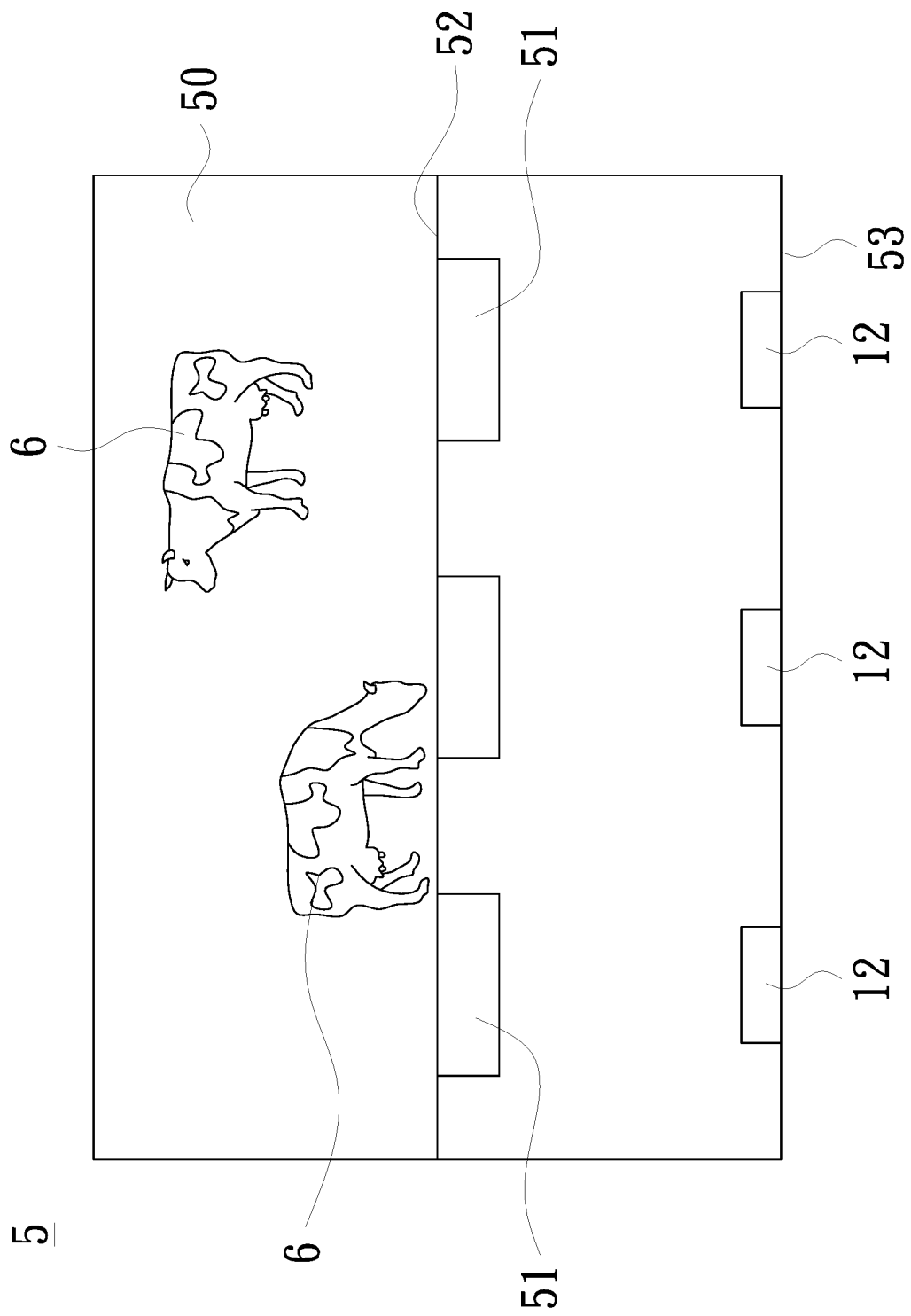
FIG. 1A is a schematic plan view of a milk-production livestock house of a feeding analysis system of milk-production livestock of an embodiment of the present invention.
Figure 1B:
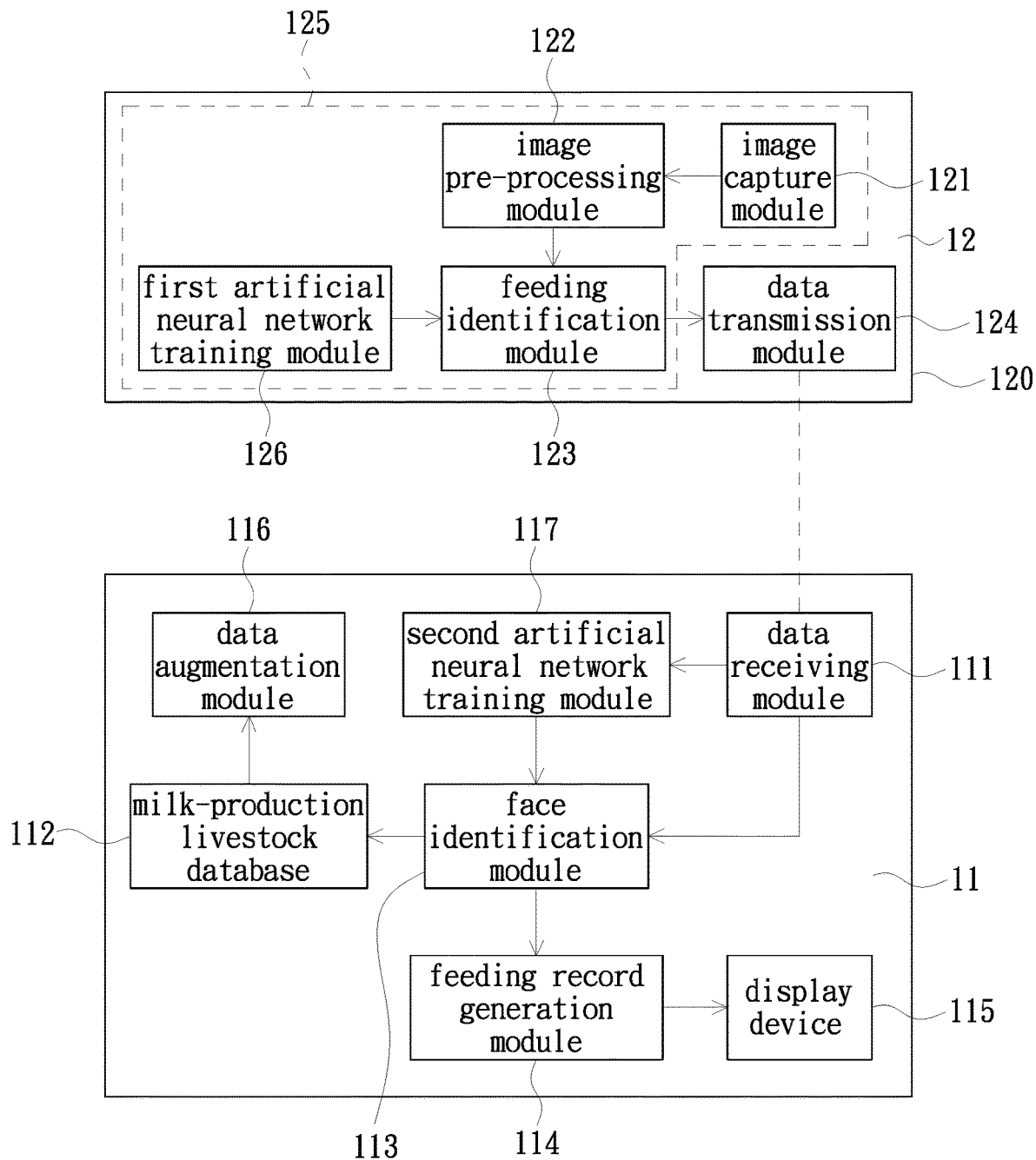
FIG. 1B is a schematic diagram of a feeding analysis system of milk-production livestock of an embodiment of the present invention.
Figure 1C:
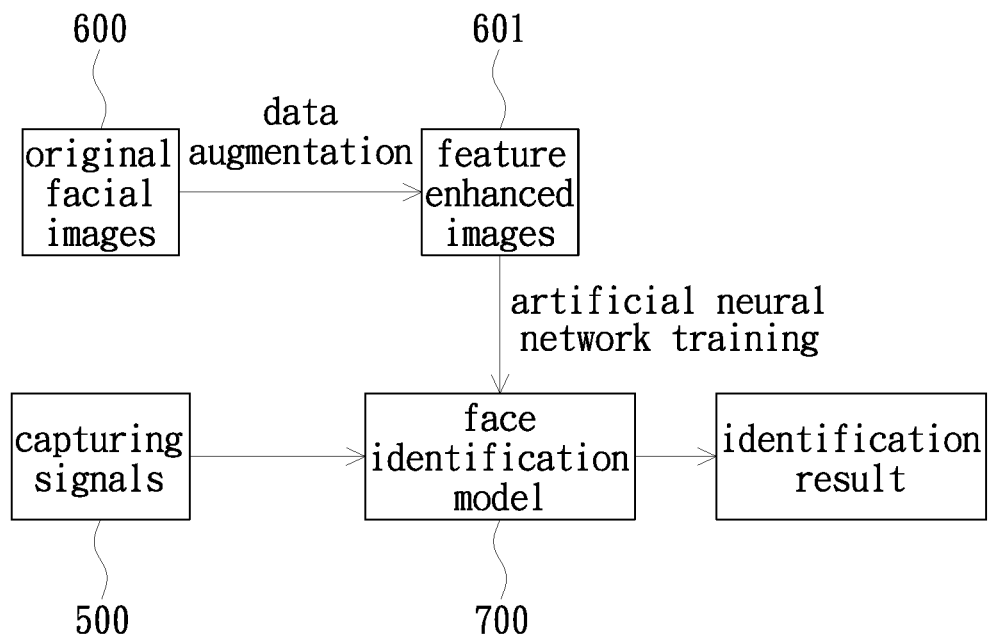
FIG. 1C is a schematic diagram of a feeding analysis system of milk-production livestock performing identities of milk-production livestock of an embodiment of the present invention.

FIG. 1A is a schematic plan view of a milk-production livestock house of a feeding analysis system of milk-production livestock of an embodiment of the present invention. FIG. 1B is a schematic diagram of a feeding analysis system of milk-production livestock of an embodiment of the present invention. FIG. 1C is a schematic diagram of a feeding analysis system of milk-production livestock performing identities of milk-production livestock of an embodiment of the present invention. Please refer to FIGS. 1A to 1C, the feeding analysis system of milk-production livestock 10 of the present embodiment is adapted to analyze the feeding status of a plurality of milk-production livestock 6 in a milk-production livestock house 5. The feeding analysis system 10 includes a central server 11 and a plurality of image analysis devices 12 signally connected to the central server 11.

The milk-production livestock house 5 may include a milk-production livestock activity area 50 and a plurality of feeding fields 51, and each of the feeding fields 51 is stacked with grass or feed. The milk-production livestock activity area 50 and the feeding fields 51 are separated by a fence 52. The fence 52 has a hollow part (not shown), and through which the milk-production livestock 6 can put their heads into the feeding fields 51 for feeding. In the present embodiment, the milk-production livestock 6 are cows, but not limited thereto. The milk-production livestock 6 can be goats or other livestock.

The plurality of image analysis devices 12 can be disposed in the milk-production livestock house 5, for example, on a wall 53 opposite to the fence 52 in the milk-production livestock house 5, but not limited thereto. For example, the plurality of image analysis devices 12 can be disposed on a ceiling (not shown) of the milk-production livestock house 5. Each image analysis device 12 includes an image capture module 121, an image pre-processing module 122 electrically connected to the image capture module 121, a feeding identification module 123 electrically connected to the image pre-processing module 122, and a data transmission module 124 electrically connected to the feeding identification module 123. The image capture module 121 is configured to capture a plurality of images of the feeding fields 51. The image pre-processing module 122 is configured to perform a clear processing, such as sharpening and/or contrast enhancing, on the plurality of images captured by the image capture module 121. The feeding identification module 123 is configured to identify a plurality of facial images of the plurality of milk-production livestock 6 for feeding action from the plurality of images have been processed by the clear processing and to generate a plurality of capturing signals 500 by capturing the plurality of facial images corresponding to each of the feeding actions and a feeding duration corresponding to the plurality of facial images. The data transmission module 124 is configured to transmit the plurality of capturing signals 500 to the central server 11.

The feeding identification module 123 is activated and determines that a milk-production livestock 6 begins for feeding when the milk-production livestock 6 puts his head into the feeding field 51 for feeding. The feeding identification module 123 determines that the milk-production livestock 6 has finished the feeding when the milk-production livestock 6 finishes the feeding. As such, a feeding duration of the milk producing livestock 6 can be obtained in accordance with the capturing times of the first facial image and the last facial image during the feeding period.

The image analysis device 12 can further include a first artificial neural network training module 126 electrically connected to the feeding identification module 123. The first artificial neural network training module 126 is configured to provide a feeding identification model to the feeding identification module 123 to identify the plurality of facial images for feeding. In an embodiment, the first artificial neural network training module 126 can be further electrically connected to the image pre-processing module 122 or the image capture module 121 to train the feeding identification model by the image capture module 121 capturing the images of the milk-production livestock 6 for feeding.

The image analysis device 12 may include a case 120 and a circuit main board 125 disposed in the case 120. The image capture module 121 may include optical elements (not shown) and circuits (not shown) disposed on the circuit main board 125. The image pre-processing module 122, the feeding identification module 123 and the first artificial neural network training module 126 can be circuits (not shown) or chip (not shown) having build-in programs or algorithms on the circuit main board 125, wherein the first artificial neural network training module 126 can be a program with artificial intelligence. The data transmission module 124 can be a network interface card (not shown) disposed in the case 120 and electrically connected to the circuit main board 125, but not limited thereto. The data transmission module 124 can also be a circuit or a chip disposed on the circuit main board 125. The circuit main board 125 may be further provided with a central processing unit (not shown) for driving the above circuits and elements.

The central server 11 includes a data receiving module 111, a milk-production livestock database 112, a face identification module 113 and a feeding record generation module 114. The data receiving module 111 is signally connected to the data transmission module 124 and configured to receive each of the plurality of capturing signals 500. The milk-production livestock database 112 has a plurality piece of milk-production livestock data, and each piece of milk-production livestock data includes a milk-production livestock identity and a plurality of original facial images 600 associated with the milk-production livestock identity. The face identification module 113 is electrically connected to the data receiving module 111 and the milk-production livestock database 112. The face identification module 113 is configured to identify the milk-production livestock identity of the plurality of facial images in each of the plurality of capturing signals 500 in accordance with the original facial images 600 in the milk-production livestock database 112. The feeding record generation module 114 is electrically connected to the face identification module 113 and configured to generate a feeding record by integrating the identified identifies of the milk-production livestock 6 and the feeding duration of each of the plurality of capturing signals 500.

In the present embodiment, the central server 11 may further include a data augmentation module 116 electrically connected to the milk-production livestock database 112 and a second artificial neural network training module 117 electrically connected to the data augmentation module 116 and the face identification module 113. The data augmentation module 116 is configured to augment each of the plurality of original facial image 600 into a plurality of feature enhanced images 601 by, for example, rotating, local twisting, and/or contrasting on each of the plurality of original face images 600. The second artificial neural network training module 117 is configured to train the plurality of feature enhanced images 601 to generate a face identification model 700. The face identification module 113 is configured to identify the plurality of facial images corresponding to each of the plurality of capturing signals 500 in accordance with the face identification model 700.

In the present embodiment, the face identification module 113 is further configured to add the plurality of facial images corresponding to each of the plurality capturing signals 500 to the plurality of original facial images 600 in the milk-production livestock database 112 to update the plurality of original facial images 600. The data augmentation module 116 and the second artificial neural network training module 117 are configured to rebuild the face identification model 700 in accordance with the updated plurality of original face images 600. The central server 11 may set the rebuilding cycle of the face identification model 700 or automatically rebuild the face identification model 700 when a certain number of milk-production livestock identities are identified. In addition, the milk-production livestock database 112 can establish a new milk-production livestock identity in accordance with a certain capturing signal 500 when the face identification module 700 fails to identify a milk-production livestock identity of the plurality of facial images corresponding to this capturing signal 500.

The central server 11 can further include a display device 115 electrically connected to the feeding record generation module 114 to display feeding records of each of the milk-production livestock 6. The feeding records can be integrated with temperature information, humidity information and milk-production information in the duration and displayed on the display device 115, thereby tracking and managing the status of individual milk-production livestock 6.

The central server 11 can be a computer or a work station, which includes a host (not shown), a mother board (not shown) disposed in the host, a hard disk (not shown) electrically connected to the mother board, and the display device 115 signally connected to the mother board. The hard disk can be installed with milk-production livestock management software. The data receiving module 111 can include a network interface card (not shown) electrically connected to the mother board. The milk-production livestock management software is connected to the data receiving module 111 trough operation software of the center server 11. The plurality pieces of milk-production livestock identities and the original facial images 600 of the milk-production livestock database 112 are a plurality of files stored in some folders in the hard disk and readable for the milk-production livestock management software. The face identification module 113, the feeding record generation module 114, the data augmentation module 116 and the second artificial neural network training module 117 can be programs in the milk-production livestock management software, wherein the data augmentation module 116 can be a program with an algorism, and the second artificial neural network training module 117 can be an algorism program with artificial intelligence. The feeding records can be also a plurality of files stored in a folder in the hard disk and readable for the milk-production livestock management software. The feeding records, the temperature information, the humidity information and the milk-production information can be files stored in the hard disk of the center server 11. The milk-production livestock management software can read the files and display these files in a form such as a table on the display device 115.

Figure 2A:
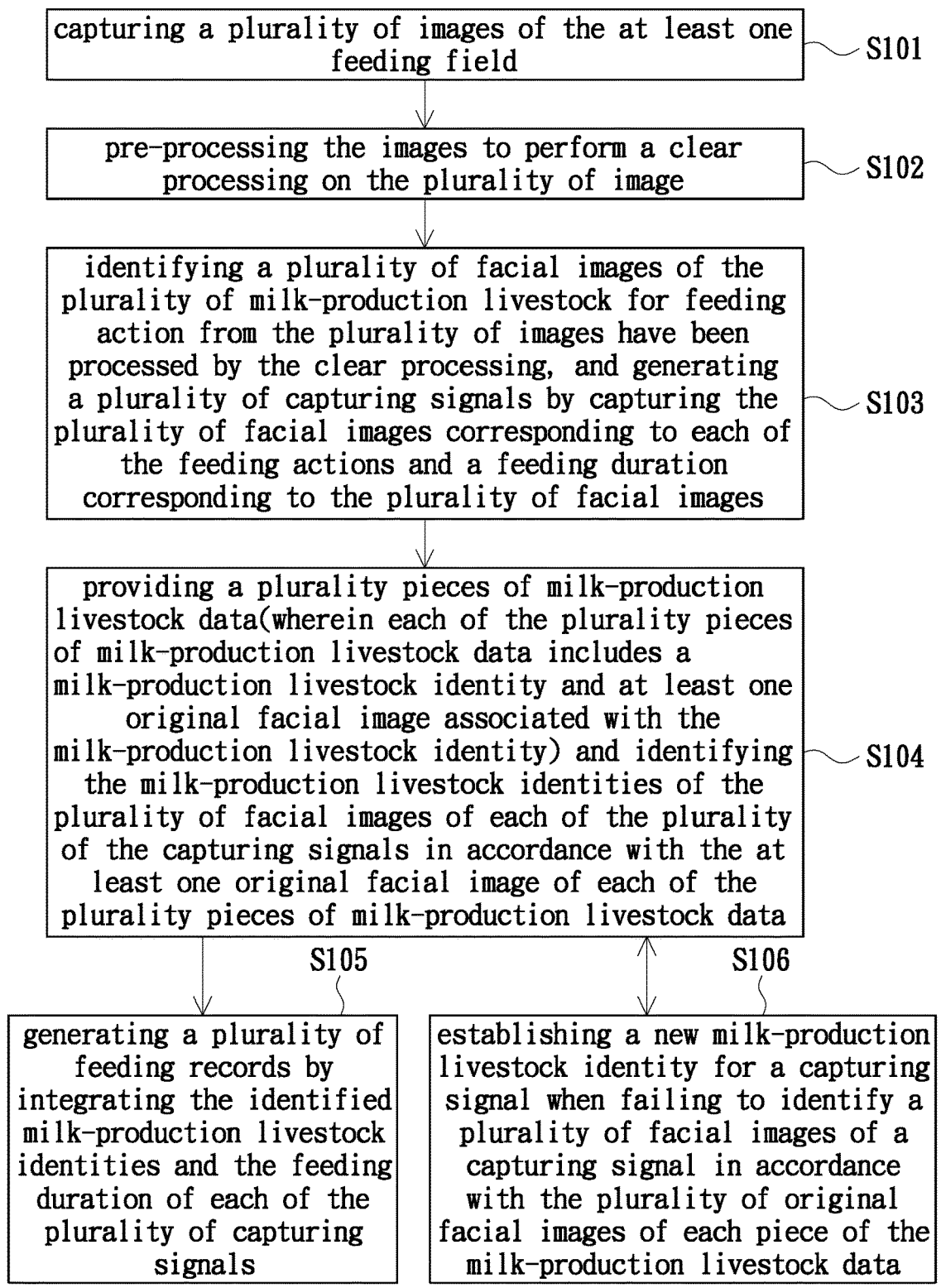
FIG. 2A is a flow chart of a feeding analysis method of milk-production livestock of an embodiment of the present invention.

FIG. 2A is a flow chart of a feeding analysis method of milk-production livestock of an embodiment of the present invention. FIG. 2B is a flow chart of a method for identifying milk-production livestock identities of an embodiment of the present invention. Please refer to FIGS. 2A and 2B, a feeding analysis method for milk-production livestock of the present embodiment is adapted to analyze a feeding status of a plurality of milk-production livestock for feeding in at least one feeding field in a milk-production livestock house, and the method includes the following steps.

S101: capturing a plurality of images of the at least one feeding field. In an embodiment, the image capture module 121 of the image analysis device 12 in FIG. 1A can be used to record the feeding field 51 in the milk-production livestock house 5, but not limited thereto.

S102: pre-processing the images to perform a clear processing on the plurality of image. In an embodiment, the image pre-processing module 122 of the image analysis device 12 in FIG. 1B can be used to perform process such as sharpening or contrast enhancement on the images captured by the image capture module 121, but not limited thereto.

S103: identifying a plurality of facial images of the plurality of milk-production livestock for feeding action from the plurality of images have been processed by the clear processing, and generating a plurality of capturing signals by capturing the plurality of facial images corresponding to each of the feeding actions and a feeding duration corresponding to the plurality of facial images. In an embodiment, this step may be performed, for example, by the feeding identification module 123 in FIG. 1B, but not limited thereto.

S104: providing a plurality pieces of milk-production livestock data (wherein each of the plurality pieces of milk-production livestock data includes a milk-production livestock identity and at least one original facial image associated with the milk-production livestock identity) and identifying the milk-production livestock identities of the plurality of facial images of each of the plurality of the capturing signals in accordance with the at least one original facial image of each of the plurality pieces of milk-production livestock data. In an embodiment, as shown in FIG. 1B, the data transmission module 124 of the image analysis device 12 can be used to transmit each of the capturing signals to the data receiving module 111 of the center server 11, and then the face identification module 113 can be used to perform identification, but not limited thereto.

The step S104 includes the following steps.

S1041: augmenting the at least one original facial image of each piece of the milk-production livestock data into a plurality of feature enhanced images. This step can be performed, for example, by the data augmentation module 116 in FIG. 1B, but not limited thereto.

S1042: training the plurality of feature enhanced images in a neural network-like training manner to generate a face identification model. This step can be performed, for example, by the second artificial neural network training module 117 in FIG. 1B, but not limited thereto.

S1043: identifying the plurality of facial images corresponding to each of the plurality of capturing signals in accordance with the face identification model. This step can be performed, for example, by the face identification module 113 in FIG. 1B, but not limited thereto.

In the present embodiment, the step 104 may further include a step 1044: adding the facial images into the original facial images in the milk-production livestock database to update the plurality of original facial images after the milk-production livestock identities of each of the plurality of capturing signals are identified, and returning to step S1041. The face identification model can be updated by the step 1041 and the step 1042.

S105: generating a plurality of feeding records by integrating the identified milk-production livestock identities and the feeding duration of each of the plurality of capturing signals. This step can be performed, for example, by the feeding record generation module 114 in FIG. 1B, but not limited thereto.

In the present embodiment, a step S106 can be further included, in which: establishing a new milk-production livestock identity for a capturing signal when failing to identify a plurality of facial images of a capturing signal in accordance with the plurality of original facial images of each piece of the milk-production livestock data. This step can be performed, for example, by the milk-production livestock data 112 in FIG. 1B, but not limited thereto.

The embodiments of the present invention obtain feeding information of the milk-production livestock by using image identification technology. The adopted image analysis devices do not contact the milk-production livestock, so that the influences such as chip failure or tag-dropping due to the movements of the milk-production livestock can be avoided, thereby the embodiments of the present invention have high reliability. Further, in the obtaining of feeding information of the milk-production livestock by using image identification technology in the embodiments of the present invention, since the feeding information is recorded only when a feeding action is actually performed by the milk-production livestock, the false sensing of an electronic tag in the prior art can be avoided, thereby the embodiments of the present invention have high accuracy. In addition, it is unnecessary for the embodiments of the present invention to implant chip into a milk-production livestock or hang a tag on the milk-production livestock, thereby complying with humanitarian spirit, and the unknown health hazards to the milk-production livestock can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A feeding analysis system of milk-production livestock, adapted to analyze a feeding status of a plurality of milk-production livestock in a milk-production livestock house, and the feeding analysis system comprising:
   a plurality of image analysis devices, disposed around a plurality of feeding fields in the milk-production livestock house, and each of the plurality of image analysis devices comprising:
      an image capture module, configured to capture a plurality of images of one of the plurality of feeding fields;
      an image pre-processing module, electrically connected to the image capture module and configured to perform a clear processing on the plurality of image of one of the plurality of feeding fields;
      a feeding identification module, electrically connected to the image pre-processing module and configured to identify a plurality of facial images of the plurality of milk-production livestock for feeding action from the plurality images of one of the plurality of feeding fields have been processed by the clear processing and generate a plurality of capturing signals by capturing the plurality of facial images corresponding to each of the feeding actions and a feeding duration corresponding to the plurality of facial images; and
      a data transmission module, electrically connected to the feeding identification module and configured to transmit the plurality of capturing signals; and
   a central server, signally connected to each of the plurality of image analysis devices, and the central server comprising:
      a data receiving module, configured to receive the plurality of capturing signals;
      a milk-production livestock database, having a plurality pieces of milk-production livestock data, and each of the plurality pieces of milk-production livestock data comprises a milk-production livestock identity and at least one original facial image associated with the milk-production livestock identity;
      a face identification module, electrically connected to the data receiving module and the milk-production livestock database, configured to identify the milk-production livestock identities of the plurality of facial images in each of the plurality of the capturing signals in accordance with the at least one original facial image of each of the plurality pieces of milk-production livestock data; and
      a feeding record generation module, electrically connected to the face identification module and configured to generate feeding records by integrating the identified milk-production livestock identities and the feeding duration of each of the plurality of capturing signals;
   wherein the image analysis device further comprises an artificial neural network training module electrically connected to the feeding identification module, and the artificial neural network training module is configured to provide a feeding identification model to the feeding identification module to identify the plurality of facial images.

2. The feeding analysis system of milk-production livestock according to claim 1, wherein the central server further comprises a display device electrically connected to the feeding record generation module and configured to display the feeding record of each of the plurality of milk-production livestock.

3. The feeding analysis system of milk-production livestock according to claim 1, wherein the central server further comprises:
   a data augmentation module, electrically connected to the milk-production livestock database; and
   an artificial neural network training module, electrically connected to the data augmentation module and the face identification module;
   wherein the data augmentation module is configured to augment each of the plurality original facial image into a plurality of feature enhanced images, and the artificial neural network training module is configured to train the plurality of feature enhanced images to generate a face identification model, and the face identification module is configured to identify the plurality of facial images corresponding to each of the plurality of capturing signals in accordance with the face identification model.

4. The feeding analysis system of milk-production livestock according to claim 3, wherein the data augmentation module is configured to obtain the plurality of feature enhanced images by rotating, local twisting, and/or contrasting on each of the plurality of original face images.

5. The feeding analysis system of milk-production livestock according to claim 3, wherein the face identification module is further configured to add the plurality of facial images corresponding to each of the plurality capturing signals to the plurality of original facial images of the milk-production livestock database to update the plurality of original facial images, the data augmentation module and the artificial neural network training module update the face identification model in accordance with the updated plurality of original face images, wherein the milk-production livestock database establishes a new milk-production livestock identity for each of the plurality of facial images corresponding to each of the plurality of capturing signals when the face identification module fails to identify the milk-production livestock identities of the plurality of facial images corresponding to each of the plurality of capturing signals.

* * * * *